(12) United States Patent
Weingarten

(10) Patent No.: US 11,455,697 B2
(45) Date of Patent: Sep. 27, 2022

(54) METHOD OF CONVERTING SENIOR RENTAL REAL PROPERTY INTO PRIVATE TITLE OWNERSHIP FOR SENIOR PERSON

(71) Applicant: Shlomy Weingarten, Pacific Palisades, CA (US)

(72) Inventor: Shlomy Weingarten, Pacific Palisades, CA (US)

( * ) Notice: Subject to any disclaimer, the term of this patent is extended or adjusted under 35 U.S.C. 154(b) by 809 days.

(21) Appl. No.: 15/981,866

(22) Filed: May 16, 2018

(65) Prior Publication Data

US 2019/0355078 A1 Nov. 21, 2019

(51) Int. Cl.
| | |
|---|---|
| *G06Q 10/10* | (2012.01) |
| *G06Q 10/06* | (2012.01) |
| *G06Q 30/06* | (2012.01) |
| *G06Q 30/02* | (2012.01) |
| *G06Q 50/16* | (2012.01) |
| *G06Q 40/02* | (2012.01) |
| *G06Q 50/18* | (2012.01) |

(52) U.S. Cl.
CPC ......... *G06Q 50/167* (2013.01); *G06Q 40/025* (2013.01); *G06Q 50/188* (2013.01)

(58) Field of Classification Search
CPC ... G06Q 40/025; G06Q 50/167; G06Q 50/188
USPC .................................. 705/313, 316, 1.1–912
See application file for complete search history.

(56) References Cited

U.S. PATENT DOCUMENTS

| | | | | |
|---|---|---|---|---|
| 6,049,781 A * | 4/2000 | Forrest | .................... | G06Q 10/08 705/30 |
| 6,738,751 B1 * | 5/2004 | Richiusa | ................ | G06Q 20/04 705/33 |
| 6,865,559 B2 * | 3/2005 | Dutta | ..................... | G06Q 20/02 705/318 |
| 7,974,917 B2 * | 7/2011 | Wagner | .................. | G06Q 40/00 705/38 |

(Continued)

OTHER PUBLICATIONS

San Diego, "Condominium Conversions," The City of San Diego Manager's Report. Report No. 03-186. Sep. 11, 2003, https://docs.sandiego.gov/reportstocouncil/2003/03-186.pdf. (Year: 2003).*

(Continued)

*Primary Examiner* — Jonathan P Ouellette
(74) *Attorney, Agent, or Firm* — Raymond Y. Chan; David & Raymond Patent Firm

(57) ABSTRACT

A rental real property converting method for seniors includes the steps of (a) executing a preliminary sale agreement between the seniors as conditional purchasers and a seller of the rental real property; (b) converting apartments of the rental real property into a plurality of condominium properties that a sole ownership of the rental real property is converted into multiple ownerships for sale units, wherein a market value of each of the condominium properties must be higher than a sale price of the corresponding to apartment of the rental real property; and (c) selling the condominium property to the respective conditional purchaser, wherein an amount of the "reverse mortgage" loan, in responsive to the market value of the respective condominium property, is (Continued)

pre-arranged for paying off the corresponding apartment of the rental real property at the sale price thereof and a conversion cost of the corresponding apartment.

8 Claims, 4 Drawing Sheets

(56) References Cited

U.S. PATENT DOCUMENTS

| | | | | |
|---|---|---|---|---|
| 2001/0047280 A1* | 11/2001 | Alexander | ............. | G06Q 40/12 705/1.1 |
| 2003/0236676 A1* | 12/2003 | Graham | ................. | G06Q 40/02 705/316 |
| 2009/0125283 A1* | 5/2009 | Conover | ................ | G06Q 10/10 703/1 |
| 2012/0116983 A1* | 5/2012 | Mak | ..................... | G06Q 50/163 705/314 |
| 2013/0346286 A1* | 12/2013 | Narayan | .............. | G06Q 40/025 705/38 |
| 2014/0129366 A1* | 5/2014 | Mudhar | ............... | G06Q 50/167 705/26.4 |
| 2016/0171576 A1* | 6/2016 | Dryden | ................ | G06Q 50/188 705/80 |

OTHER PUBLICATIONS

Federal Trade Commission, "Reverse Mortgages," https://www.consumer.ftc.gov/articles/0192-reverse-mortgages. Dec. 17, 2012. (Year: 2012).*

County of San Diego, Planning & Development Services, Condominium Conversion Applicant's Guide. May 27, 2016. (Year: 2016).*

Michigan Condominium Act, "Act 59 of 1978," Am. 1998, Act 36, Imd. Eff. Mar. 18, 1998. http://www.legislature.mi.gov/documents/mcl/pdf/mcl-Act-59-of-1978.pdf. (Year: 1998).*

Jay Romano, Your Home; Navigating Offering Documents, N.Y. Times, Dec. 7, 2003, https://www.nytimes.com/2003/12/07/realestate/your-home-navigating-offering-documents.html. (Year: 2003).*

Adam Leitman Bailey and Jeffrey Metz, Fair-Market Tenants and Condominium Conversion, N.Y.L.J., Feb. 11, 2015, https://www.law.com/newyorklawjournal/almID/1202717535303/. (Year: 2015).*

NYU Furman Center, "Gentrification Response: A Survey of Strategies to Maintain Neighborhood Economic Diversity," Oct. 2016. https://furmancenter.org/files/NYUFurman Center_GentrificationResponse_26OCT2016.pdf. (Year: 2016).*

"Condominium Offering Plan: 141 Viva Bene Condominium," Apr. 24, 2006. http://www.miradoprop.com/141/141Plan/141_MAIN_ACCEPTED_PLAN.pdf (Year: 2006).*

David A. Fine, The Condominium Conversion Problem: Causes and Solutions, Duke L.J. 306 (1980). (Year: 1980).*

* cited by examiner

METHOD OF CONVERTING SENIOR RENTAL REAL PROPERTY INTO PRIVATE TITLE OWNERSHIP FOR SENIOR PERSON

BACKGROUND OF THE PRESENT INVENTION

Field of Invention

The present invention relates to reverse mortgage, and more particularly to a method of converting senior rental real property into private title ownership for senior person, wherein the method is designed to provide financial security, financial help and assist for senior residents especially live in the United States in rental properties to purchase rental real property.

Description of Related Arts

Conventionally, a reverse mortgage (also known as a lifetime mortgage) is a loan available to seniors (62 and older in the United States), and is used to release the home equity in the property in the form of one lump sum or multiple payments. The homeowner's (i.e. the seniors) obligation to repay the loan is deferred until the owner dies, the home is sold, or the owner leaves. In a conventional mortgage practice, the homeowner makes a monthly payment to the lender. After each payment, the equity increases in his or her property, and typically after the end of the term, the mortgage has been paid in full and the property is released from the lender. In a reverse mortgage, the home owner makes no payments and all interest is added to the lien on the property. The owner may receive monthly payments, or a bulk payment of the available equity percentage for their age, then the debt on the property increases each month.

On the other hand, condo conversion is a process of entitling an income property or other lands currently held under one title to convert from sole ownership of the entire property (such as an apartment) into individual units. Such entitlement is generally derived from approvals granted by the relevant state and/or local municipal authorities.

Large elderly population in the United States are living in housing units, senior living units that unfortunately they don't own and in addition these seniors are living with a dependency and burden of making rental payments for their daily housing needs. That population is the largest growing segment by staggering numbers.

This is a continuance and undesirable chase and race of time by seniors to meet financial obligations and stressful mandates to survive instead of better experience of the remaining of an individual life time to enjoy the most of it.

As a matter of fact, many elder people are living in senior houses which are essentially apartments belonging to a huge complex. It is the law of many states (such as California) that prohibits the selling and purchasing of individual apartments within a huge complex. As a result, take California as an example, people living within those apartments cannot purchase that property alone (i.e. the individual apartment which a particular person is living).

On the other hand, senior living units are continually under instability of the availability, maintenance and up keep of their housing units and in some cases even improper and unacceptable living conditions. These are due to the shaky and trembling situations and volatility of foreclosure actions, repos and taking over of senior housing units by financial institutions, various lenders, commercial mortgage or paper holders, service companies, 20 trustees and various elements that can trigger and conduct actions of Taking ownership from any owners of Senior living rental housing units.

The consequences of the above practical situations are that many elder people, being retired and living in senior houses, have significant financial constraints concerning their daily life and their living situation. For many elder people, they may be funded by the government or their relatives to pay the monthly rent of the apartment. Yet when some unexpected events happen, such as their relative got laid off and loss their job as well, the relevant elder people who are living in one of those senior houses (i.e. one of those apartments) may not have the necessary financial resources to continually live in there, yet they certainly do not have the adequate resources to purchase another property. Of course, the relevant government, as a matter sound welfare policy, may provide subsidy to those who are in need of money, but this involves a huge amount of public funding certainly constitutes a great financial burden to any governmental body.

In addition, the financial instability and the unknown of volatility market conditions especially in recession, depression times and inflation are effecting and impacting especially the elderly and the senior population and their life expectancy. These unfortunate and adverse experiences are damaging the elderly and seniors It is affecting and diminishing their lives,their health, their mental and spirit conditions, These experiences are worsening families and livelihoods and through the remaining life time that they might experience and achieve.

SUMMARY OF THE PRESENT INVENTION

An object of the present invention is to provide a method of converting senior rental real property into private title ownership for senior person, which is designed to provide financial security, financial help and assist for senior residents that live in the United States in rental properties.

Another object of the present invention is to provide a method converting senior rental real property into private title ownership for senior person, which is to help senior renters to convert from being renters to home owners without the burden of any mortgage payment.

Another object of the present invention is to provide a method of converting senior rental real property into private title ownership for senior person involving reverse mortgage transactions.

Another object of the present invention is to provide a method of converting senior rental real property into private title ownership for senior person involving reverse mortgage transactions, which is capable of assisting seniors to purchase their own property without imposing significant financial burden on them.

Another object of the present invention is to provide a method of converting senior rental real property into private title ownership for senior person involving reverse mortgage transactions, which is capable of providing a significant amount of extra money to seniors while at the same time allowing them to purchase their own property.

Another object of the present invention is to provide a method of converting senior rental real property into private title ownership for senior person involving reverse mortgage transactions, wherein the method can be carried out by a service provider for coordinating the relevant business transactions between a seller and a buyer (a senior person).

Another object of the present invention is to provide a method of converting senior rental real property into private title ownership for senior person involving reverse mortgage transactions, which is capable of facilitating flexible use of a huge complex which is otherwise not for sale to individual elder people living in that complex.

Another object of the present invention is to provide a method of converting senior rental real property into private title ownership for senior person for assisting, improving senior housing life style, reducing housing expenses and stress, land lord dependency, and inverting rental payment obligation to rent free and/or mortgage payment free living and life style.

Another object of the present invention is to provide a method of converting senior rental real property into private title ownership for senior person which causes the availability of more disposable money to the elderly to better enjoyment of life and afford more of what life have to offer.

Another object of the present invention is to provide a method of converting senior rental real property into private title ownership for senior person which will ease, slow and reduce the draws of payments from the Social Security System for the use of housing payments by the senior population. These type draws are growing to endangering levels of burdening and straining the system, resulting a healthier and more stabilized Social Security System and among others better performance and ability of the system Another object of the present invention is to provide a method of converting senior rental real property into private title ownership for senior person which successfully drives and results increase of life expectancy and better happier life's of a very large senior population.

Accordingly, in order to accomplish the above objects, the present invention provides a method of purchasing rental real property for seniors, comprising the steps of:

(a) executing a preliminary sale agreement between the seniors as conditional purchasers and a seller of the rental real property, wherein each of the conditional purchasers is pre-qualified for applying a "reverse mortgage" loan;

(b) converting apartments of the rental real property into a plurality of condominium properties that a sole ownership of the rental real property is converted into multiple ownerships for sale units, wherein a market value of each of the condominium properties must be higher than a sale price of the corresponding apartment of the rental real property; and (c) selling the condominium property to the respective conditional purchaser, wherein an amount of the "reverse mortgage" loan, in responsive to the market value of the respective condominium property, is pre-arranged for paying off the corresponding apartment of the rental real property at the sale price thereof and a conversion cost of the corresponding apartment.

These and other objectives, features, and advantages of the present invention will become apparent from the following detailed description, the accompanying drawings, and the appended claims.

DETAILED DESCRIPTION OF THE PREFERRED EMBODIMENT

Figure 1:
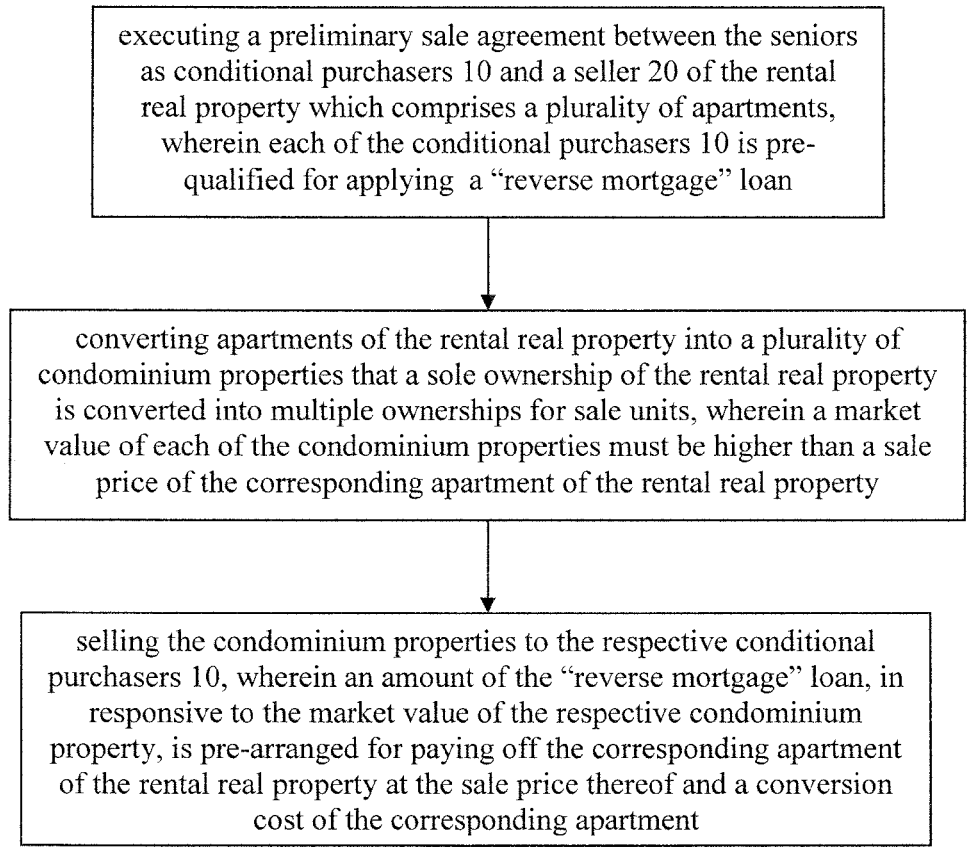
FIG. 1 is a flow diagram of a method of purchasing rental real property for seniors according to a preferred embodiment of the present invention.
Figure 2:
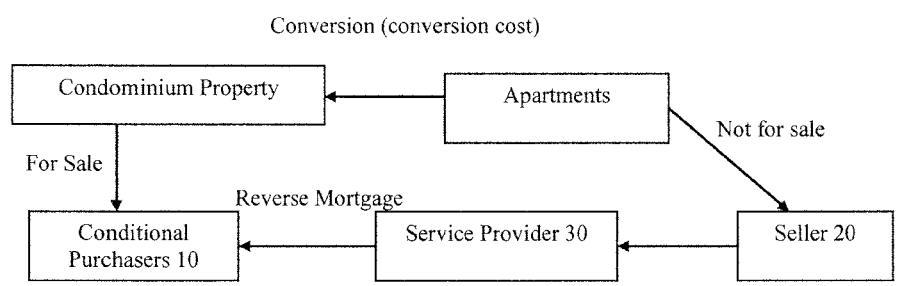
FIG. 2 is a schematic diagram of a method of purchasing rental real property for seniors according to the above preferred embodiment of the present invention.

Referring to FIG. 1 to FIG. 2 of the drawings, a method of purchasing rental real property for seniors is illustrated, wherein the method comprises the steps of:

(a) executing a preliminary sale agreement between the seniors as conditional purchasers 10 and a seller 20 of the rental real property which comprises a plurality of apartments, wherein each of the conditional purchasers 10 is pre-qualified for applying a "reverse mortgage" loan;

(b) converting apartments of the rental real property into a plurality of condominium properties that a sole ownership of the rental real property is converted into multiple ownerships for sale units, wherein a market value of each of the condominium properties must be higher than a sale price of the corresponding apartment of the rental real property; and (c) selling the condominium properties to the respective conditional purchasers 10, wherein an amount of the "reverse mortgage" loan, in responsive to the market value of the respective condominium property, is pre-arranged for paying off the corresponding apartment of the rental real property at the sale price thereof and a conversion cost of the corresponding apartment.

According to the preferred embodiment of the present invention, in step (a), the conditional purchaser 10 is a tenant of the respective apartment of the rental real property such that the conditional purchaser 10, who becomes an owner of the corresponding condominium property after the apartment is converted, is rent-free and mortgage payment free to live in the condominium property. In other words, the rental real property is a senior rental property that the seniors are residing therein. Before the rental real property was converted into condominium properties, the tenant (i.e. the conditional purchaser 10) has to pay rent on a monthly basis. After the rental real property has been converted into condominium properties, the conditional purchaser 10 (i.e. the same person living in the corresponding apartment of the rental real property) will have purchased the condominium (i.e. an individually salable property) which is converted from a corresponding apartment and he or she becomes a home owner of that particular property. He or she no longer needs to pay rent on a monthly basis.

The preliminary sale agreement includes an appraisement of the market value of the respective condominium property after the conversion has been carried out, an estimation of the conversion cost, and a "Contract of purchase" for the purchase and sale of the rental real property between the seller 20 thereof and the conditional purchaser 10. The market vale, the "Contract of purchase" and the sale of the rental real property provide the incentive for the relevant and a service provider to conduct the business method explicated above.

Since the subject matter of the present invention is to allow elder people living in the rental real property to own their own real property after the rental real property has been converted into the respective condominium property, the conditional purchaser 10 is pre-settled to pay off a reminder amount of the sale price of the corresponding condominium property when the amount of the "reverse mortgage" loan is less than a lump sum of the sale price of the corresponding apartment of the rental real property and the conversion cost of the corresponding apartment. After the pre-settlement, the reverse mortgage loan is capable of paying off the same price of the corresponding apartment and the conversion cost involved in the conversion process from the apartment to the condominium property. Accordingly, the conversion cost will include the remodeling cost of the apartment to become the condominium property, such as the firewall construction, in responsive to the corresponding state law and/or the cost of the paper work for the condominium conversion.

Step (a) further comprises a step of verifying the rental real property being adapted to be converted into the condominium properties according to corresponding state laws. As mentioned in the background above, some states impose certain restrictions for converting apartments in a rental real property (such as a residential complex) into a corresponding number of condominium properties. Some states require remodeling one or more building structures before the apartment can be converted into condominium property. As a result, the verifying step in step (a) allows the relevant parties to ensure that their business transactions comply with the relevant legal requirements.

In order to enhance the incentive of carrying out the business method of the present invention, step (a) further comprises a step of setting a purchase threshold as a clause that stipulates a minimum number of the conditional purchasers agreeing to purchase the rental real property. Since the number of condominium properties that would be sold to the conditional purchases 10 depend on the number of conditional purchasers 10 who are willing to purchase the apartment which he or she is living, when few elder people are willing to purchase the apartments, it is not profitable for the owner of the rental real property to convert the entire residential complex into individual condominium properties because of the cost of the conversion. In other words, there is little commercial reason for converting apartments into individual condominium properties when the people living in the apartments are unwilling to purchase the unconverted property.

In order to effectuate the above mentioned business method, the preliminary sale agreement can be prescribed through an escrow service that one of the conditional purchasers 10 and the seller 20 must agree to pay a predetermined amount of service fee to the service provider 30 who is providing the escrow service. As such, a communication bridge is established through a service provider 30 for communicating between the conditional purchasers 10 and the seller 20 in such a manner that the service provider 30 gathers information of the conditional purchasers 10 and updates information from the seller 20 so as to establish the preliminary sale agreement between the conditional purchasers 10 and the seller 20. When the preliminary sale agreement has been executed, a predetermined percentage of the sale price or the amount of the reverse mortgage (or any other agreed service fee) is payable to the service provider 30 for the execution of the escrow service. The service provider can be a real estate agent, or a service branch established by the owner of the rental real property who is willing to convert the rental real property into the condominium properties through reverse mortgage secured by the conditional purchasers 10.

As a result, it is worth mentioning that the conditional purchasers 10 must be qualified to take a reverse mortgage from a legitimate or a predetermined loan service provider for paying off the sale price and the conversion cost of the respective condominium property.

As a result, step (a) further comprises a step of assisting the conditional purchasers 10 to secure a reverse mortgage for the condominium property so that the conditional purchasers 10 are able to pay off the sale price and the conversion cost of the respective condominium property. Note that the reverse mortgage service provider may be an independent bank, or the owner of the rental real property.

Figure 3:
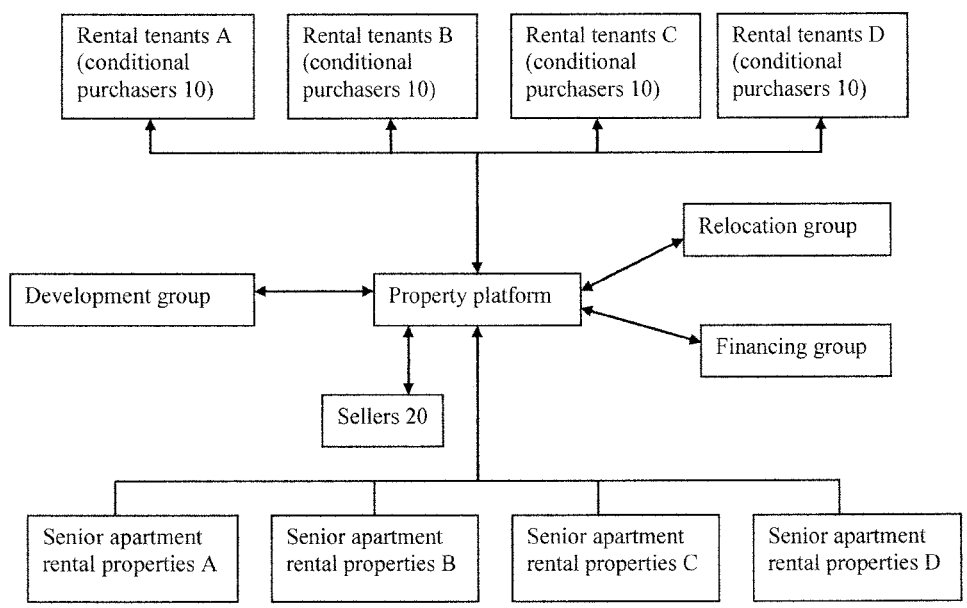
FIG. 3 is a block diagram of the system illustrating the property platform collaboration among a development group, a relocation group, and a financing consulting group.

According to the preferred embodiment, the present invention further comprises a property platform for the conditional purchasers 10 being converted from the renters to home owners. In addition, the property platform is partnership collaboration among a development group, a relocation group, and a financing consulting group, as shown in FIG. 3.

Figure 4:
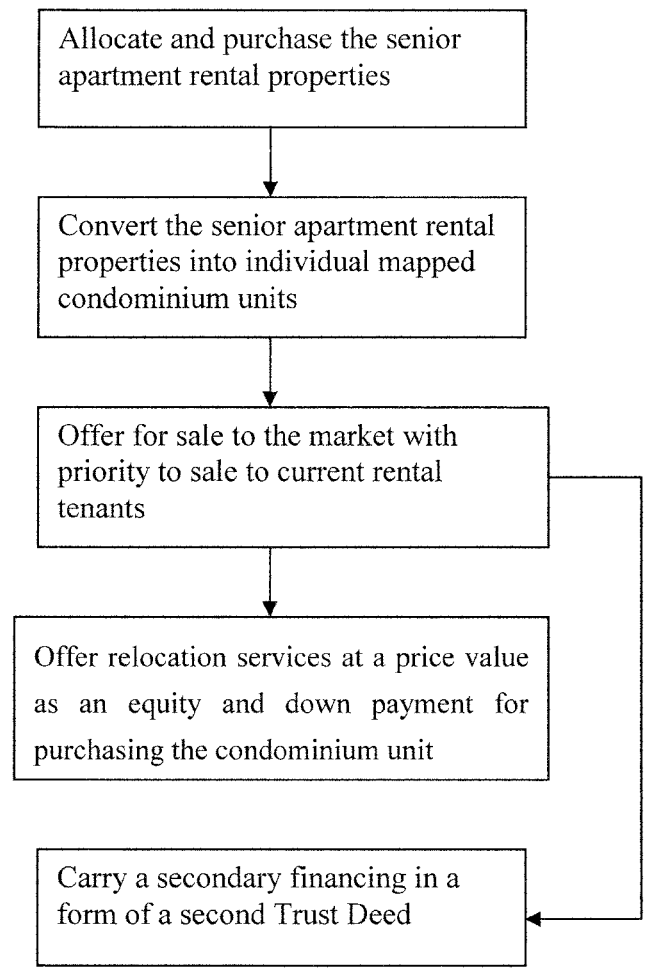
FIG. 4 is a flow diagram of a method of converting senior rental tenants to home owners according to the above preferred embodiment of the present invention.

In view of the development group, as shown in FIG. 4, the present invention provides a method of converting senior rental tenants to home owners that the seniors can purchase rental real property, comprising the following steps.

(1) Allocate and purchase the senior apartment rental properties.

(2) Convert the senior apartment rental properties into individual mapped condominium properties (units).

(3) Offer for sale to the market with priority to sale to current rental tenants, i.e. the conditional purchasers 10.

According to the preferred embodiment, the property platform is preferably a website for the conditional purchasers 10 to access through public communication network, such as Internet. Therefore, the development group can place the information of the senior apartment rental properties on the property platform. In addition, the preliminary sale agreement will be shown on the property platform for the conditional purchasers 10.

In order to access the property platform, each of the conditional purchasers 10 will firstly log in the property platform in responsive to his or her current address by the name of the conditional purchaser 10 and/or a password initially assigned by the development group. The password can be selectively changed after the first time of log in. Through the property platform, the conditional purchasers 10 will make a decision whether he or she agrees the terms of the preliminary sale agreement. The preliminary sale agreement can be signed in person by physically meeting the conditional purchaser 10 with the officer of the relocation group or through the property platform.

Furthermore, the seller 20 is able to access the property platform to update the information of the senior apartment rental properties and to view the preliminary sale agreement. It is worth mentioning that the development group can purchase the entire apartment first, as in the step (1), such that the development group becomes the seller 20 of the senior apartment rental properties to sell to the current rental tenants as the conditional purchasers 10.

In the step (1), the development group will verify the senior apartment rental properties being adapted to be converted into the condominium unit according to corresponding state laws. In addition, the development group will also verifies each of the rental tenants is pre-qualified for applying a "reverse mortgage" loan.

Accordingly, the relocation group will offer relocation services at a price value and if the rental tenants will choose not to relocate and purchase his or her unit than that price value will be owned by the tenant and can be applied as an equity and down payment for purchasing the condominium unit. In other words, when the conditional purchaser 10 agrees the preliminary sale agreement, the price value of the relocation services will be automatically applied as a down payment for the purchase. This term will be shown in the preliminary sale agreement as one of the requirements.

The financing consulting group will carry any secondary financing in a form of a second Trust Deed. The second trust deed amount will be the difference between the unit sale price and the applied equity value and any first Trust Deed financing for the purchase. The first Trust Deed financing will be the reverse mortgage financing or any other type of financing that will be replaced by reverse mortgage financing in a later stage if seasoning is required.

In light of the above, one may appreciate that the business method disclosed in the present invention allows elder people to purchase their own condominium property without having to bear the huge burden for paying off the loan. As a result, they may reserve a significant amount of their own money to engage in many other activities (such as traveling) so as to maximize their happiness during their older era. On the part of the service provider and the seller 20, they enjoy a significant amount of profit when they convert the rental real property into individual condominium properties for sale. In other words, the present invention provides a significant amount of incentives for property owners and service providers to engage in the business described above. As a result, the method of purchasing rental real property for seniors using reverse mortgage create a win-win-win (triple win) situation for the conditional purchasers 10, the seller 20 and the service providers.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of purchasing senior rental real property for seniors via an online system which comprises a property platform which is a website for said seniors to access through a public communication network, wherein said seniors are tenants of a plurality of rental apartments of a senior rental real property respectively, the method comprising steps of:
   (a) pre-qualifying reverse mortgage loans to said seniors who are said tenants of said plurality of rental apartments of said senior rental real property as conditional purchasers through said property platform;
   (b) via said public communication network, receiving a preliminary sale agreement by said property platform, which is executed between said seniors as conditional purchasers and a seller of said senior rental real property, wherein, in said preliminary sale agreement, said conditional purchasers are pre-qualified for said reverse mortgage loans respectively, wherein after each said conditional purchaser logs in said property platform via a first internet-enabled device of each said conditional purchaser, each said conditional purchaser is able to access said property platform to view said preliminary sale agreement;
   (c) via said public communication network, sending said preliminary sale agreement from said property platform to a second internet-enabled device of a development group;
   (d) converting building structures of said rental apartments of said senior rental real property into a plurality of condominium properties according to corresponding State laws by said development group such that a sole ownership of said senior rental real property is converted into multiple ownerships for sale units, wherein a market value of each of said condominium properties must be higher than a sale price of said corresponding rental apartment of said senior rental real property;
   (e) selling said plurality of condominium properties to said conditional purchasers respectively, wherein an amount of said reverse mortgage loan, in responsive to said market value of each of said plurality of condominium properties, is pre-arranged for paying off said corresponding apartment of said rental real property at said sale price thereof and a conversion cost of said corresponding apartment; and
   (f) updating information of said plurality of condominium properties regarding apartment conversion to said first internet-enabled device of said conditional purchasers by said property platform until said plurality of condominium properties is purchased by said conditional purchasers respectively, such that said seniors who were originally tenants of said plurality of rental apartments of said rental real property become owners of said plurality of condominium properties after conversion respectively while said seniors are rent-free and mortgage payment free to live in said plurality of condominium properties respectively.

2. The method as recited in claim 1 wherein, in said preliminary sale agreement, one condition that said conditional purchaser is a said tenant of said apartment of said senior rental real property.

3. The method, as recited in claim 1, wherein said preliminary sale agreement contains an information of an appraisement of said market value of said respective condominium property after conversion, an estimation of said conversion cost, and a Contract of purchase for the purchase and sale of said senior rental real property between said seller thereof and said conditional purchaser.

4. The method, as recited in claim 1, wherein said senior rental real property is a rental real property that said seniors are residing therein.

5. The method as recited in claim 1 wherein, in said preliminary sale agreement, one condition that said conditional purchaser is pre-settled to pay off a remainder amount when said amount of said reverse mortgage loan is less than a lump sum of said sale price of said apartment of said senior rental real property and conversion cost of said apartment.

6. The method as recited in claim 1, before the step (a), further comprising a step of verifying said senior rental real property being adapted to be converted into said condominium properties by remodeling one or more of said building structures of said rental apartments of said rental real property by said development group according to the corresponding state laws.

7. The method as recited in claim 1, wherein the step (a) further comprises a step of setting a purchase threshold as a clause that stipulates a minimum number of said conditional purchasers agreeing to purchase said senior rental real property by said property platform.

8. The method, as recited in claim 1, wherein said preliminary sale agreement is prescribed through an escrow service that one of said conditional purchaser and said seller must agree to pay a predetermined amount of service fee to said escrow service.

* * * * *